3,080,255
METHOD FOR CONDITIONING RUBBER SURFACES AND FORMING FLEXIBLE RESIN COATINGS THEREON AND THE ARTICLES PRODUCED THEREBY

Herbert A. Winkelmann, Chicago, Ill., assignor to Sheller Manufacturing Corporation, Chicago, Ill., a corporation of Indiana
No Drawing. Filed Mar. 13, 1959, Ser. No. 799,077
11 Claims. (Cl. 117—47)

The present invention relates to a method for conditioning the surface of rubber to improve its receptivity for a synthetic resin coating and additionally concerns compositions for and rubber articles having on the surface thereof an adherent flexible coating having low friction characteristics.

The formation of finish coatings on rubber surfaces where are flexible and adherent under varying use conditions has long been recognized to be difficult to accomplish. A number of approaches have been employed in an attempt to overcome the poor adherence tendencies of rubber surfaces including the use of various types of adhesives, primers, rubber-modified resinous compositions, etc., but in each case the lubricity or adherence properties of the final product left much to be desired.

It is therefore the primary object of this invention to provide a method for preliminarily conditioning the surface of natural or synthetic rubber so as to render those surfaces more receptive to finished coatings including synthetic resin coatings, and particularly polyester-isocyanate resins.

Another object of this invention is to provide an improved synthetic resin composition for application to a rubber surface capable of producing an adherent flexible coating thereon which is characterized by relatively low friction properties.

A further object of this invention is to provide rubber articles improved in the respect that the surface thereof is coated with an adherent, abrasion-resistant flexible coating, which coating is characterized by substantially reduced drag resistance relative to the substrate rubber.

Another important object of this invention is to provide a method for coating a rubber surface which includes the steps of preliminarily conditioning the surface and thereafter coating the conditioned surface with a coating composition of this invention.

Another object of this invention is to provide a rubber coated article which is characterized by a surface having substantially decreased drag, good abrasion resistance, good flexibility and adhesion at temperatures as low as minus 40° F., high resistance to humidity and good adhence under high humidity conditions, high resistance to deterioration upon weather aging, and good resistance to ozone, solvents and most chemicals.

A further object of this invention is to provide a composition suitable for use in forming a finish coating on rubber which permits the concurrent attainment of the desired surface appearance and low drag resistance in the surface coating, and which composition has good storage stability, satisfactory pot life and is relatively inexpensive.

Another object of this invention is to provide a new and improved rubber article having an improved surface condition which renders the article highly useful for a variety of applications including gasketing material for doors, windows and the like in automobiles, airplanes, boats, ships, etc., certain bearing applications involving light loads, shock and vibration absorber applications, and in other applications in which it is important to have reduced drag on the rubber surface.

Other objects and advantageous features of this invention will become apparent as the following description is considered in its entirety.

It has been found that the problem of successfully providing the desired characteristics in a rubber surface coating is greatly magnified by the fact that the coating must be sufficiently flexible and adherent to the rubber surface to withstand repeated bending and flexing movements of the substrate rubber at varying temperatures. In accordance with this invention the adherence of the coatings of this invention to the surface of natural or synthetic rubber has been found to be improved by preliminarily conditioning the rubber surface to receive the coating. This conditioning treatment comprises the steps of removing grease, oils, dust, mold lubricants, soaps and the like by conventional vapor degreasing, mild alkaline or mild acidic cleaners or combinations thereof in which the alkaline or acidic cleaner follows the hydrocarbon solvent treatment and thereafter contacting this cleaned surface with a dilute aqueous acidic solution of such strength and under such conditions as to polarize the surface, or it may comprise only the latter step where the rubber surface is initially substantially clean.

The preliminary step of degreasing may be accomplished with chlorinated hydrocarbons such as carbon tetrachloride, trichloroethylene, perchloroethylene or similar solvent using conventional vapor techniques of application or the solvent may be wiped on the surface to be coated. Perchloroethylene has provided the most consistent results and is preferred for this purpose. Unusually dirty surfaces having oxidized oils or greases or heat-set mold release agents, particularly silicones, on the surface are advantageously additionally pre-cleaned by following the hydrocarbon solvent cleaning by contacting the surface with an aqueous alkaline or mildly acidic cleaner, such as tri-sodium phosphate, sodium dihydrogen phosphate, or a mixture of sodium sulfate and sodium dihydrogen phosphate, sodium orthosilicate, sodium metasilicate, etc. Such cleaning solutions may also contain wetting or emulsifying agents if desired.

The aqueous acidic polarizing solution should be sufficiently weak to avoid destructive attack of the rubber surface and yet should be sufficiently strong to modify the surface polarity so as to render it more adherent to the synthetic resin coatings of this invention. Aqueous solutions of the mineral acids having a strength equivalent to a strength between about 0.5% and 10% by weight of sulfuric acid can be used satisfactorily. Solutions stronger in acidity than the equivalent of between about 0.5% and 3% sulfuric acid offer no particular advantage over the use of the weaker solutions and since weaker solutions are less expensive and easier to handle, the weaker solutions are preferred. Hydrochloric acid solutions containing about 0.5% hydrochloric acid by weight are particularly satisfactory, and other acids which can be employed include phosphoric, acetic, formic, nitric, etc. It has also been found that the presence of a halide ion in the acidified solution is beneficial, and particularly the presence of the chloride ion. The presence of 0.01% to about 0.5% of the chloride, bromide or iodide ion in a solution having an acidity equivalent to that resulting from the presence of 0.5% sulfuric acid, by weight, improves adherence relative to that obtained from acidic solutions devoid of such ions. These halide ions can be introduced in the form of salts or at least partially as the acid, but preferably as a salt. The alkali metal hypochlorites, bromides and iodides can be used to obtain the desired concentration, preferably about 0.1% of the chloride, bromide or iodide ion. The chloride ion is preferred for this purpose.

The cleaned rubber surface is dipped or sprayed with the aqueous acidic solution, at room temperature, for a period of contact measured in seconds, and usually about 2-15 seconds is sufficient. Somewhat longer times may be required when the weaker solutions, as above specified, are used or as the acidity of the solution decreases in use. The rubber surface is then removed from the solution, rinsed in water and dried.

Broadly speaking, the coatings of this invention are polyurethanes which have been modified in a specific manner to improve the flexibility, adhesion and slip characteristics, particularly at low temperatures. These coatings are formed by drying and heat curing the urethane materials on the surface after the materials are applied as a liquid non-aqueous system. It was found that polyurethane coatings of conventional composition applied to a rubber surface under manufacturer specified conditions of application were insufficiently adherent and too brittle to withstand repeated flexures of the rubber. Moreover, even though the adhesion was improved by employing the surface conditioning method above specified, the coatings were too brittle to be satisfactory, particularly at temperatures below about −20° F. Compositions which have been employed to produce polyurethane coatings on rubber which are unsatisfactory in one or more respects are illustrated by the following specific formulation, the use of which produced the best adhesion and flexibility on rubber of the various similar compositions which were tried.

Parts by weight
Polyester resin, highly branched (Multron R-4) __ 6
Polyester resin, substantially linear (Multron R-16) _____ 18.7
Trimethylol propane tri-isocyanate, 75% (Mondur CB) _____ 16.1
Powdered silica _____ 1.8
Lamp black _____ 1.3
Cellulose acetate butyrate, 10% solution in ethyl acetate _____ 4.7
Solvent (2 parts Cellosolve acetate, 1 part xylene and 1 part toluene) _____ 50.7
Methyl chloro silane resin, 2% solution in xylol (Dri-Film No. 103) _____ 0.7

The above resinous composition was sprayed on a molded rubber surface, dried for 15 seconds and then baked in an oven for 30 minutes at 265° F. and upon testing was found to be brittle at −20° F. and subject to blistering after 24 hours at 100° F. in 100% relative humidity atmosphere.

In accordance with this invention it has been found that adhesion of the resulting coating, particularly at temperatures between 0° F. and −40° F. is greatly improved by incorporating a relatively small quantity of an epoxy resin in the composition. It was also found that the flexibility at low temperatures, as well as the adhesion, is enhanced markedly by adding to the epoxy modified composition a polyurethane elastomer. The best combination of adhesion, resistance to water vapor transmission and flexibility is obtained by incorporating in the composition containing epoxy and polyurethane elastomer modifiers a small quantity of a hydroxy terminated linear polyol-diisocyanate polymer. It was also found that the appearance of the resulting coatings could be controlled to produce a satin, gloss, or flat finish by varying the proportion of the powdered silica ingredient within certain limited ranges. Each of these modifying ingredients will be discussed in greater detail hereinbelow and their specific effects further explained.

The compositions which are suitable to form the improved coatings of this invention include the ingredients indicated in Formulation I and the modifying ingredients above mentioned. It will be understood that the properties of the resulting coatings can be widely varied by selecting specific proportions of the various ingredients within the ranges indicated and general guides for making such selection are also discussed in greater detail hereinbelow.

FORMULA I

| | Percent by weight useful range | Percent by weight preferred |
|---|---|---|
| Polyester resin | 12-21 | 14-19 |
| Isocyanato-polyfunctional (e.g. tolylene di-isocyanate) | 10-15 | 11-13 |
| Lamp black | 0.5-5.0 | 1-3 |
| Silica powder | 1-7 | 2-6 |
| Cellulose acetate butyrate 10% in ethyl acetate | 0-4 | 1.5-4 |
| Solvent (toluene, xylene, ethyl acetate, glycol monoether acetate, etc.) | 42-46 | 42-46 |
| Amine curing agent (4,4′ methylene-bis 2-chloroaniline) | .25-.8 | .25-8 |
| Methyl chlorosilane, 2% solution in xylol | 0-1.5 | .25-1.5 |
| Epoxy resin | 3-10 | 7-9 |
| Polyurethane elastomer, liquid isocyanate terminated polymer | 2-6 | 3-5 |
| Hydroxy terminated di-isocyanate polymer | 0-10 | 1-8 |

The polyesters which are suitable for use in the compositions of this invention are those polyesters which are conventionally employed with polyfunctional isocyanates to form urethane coatings, and are preferably the saturated polyesters terminating in hydroxyl groups. A large number of such materials are commercially available which are suitable for the purposes of this invention. Such saturated polyesters may be prepared by esterifying a dicarboxylic acid with a glycol under controlled conditions such that the resulting ester is terminated in hydroxyl groups, and this is insured by employing an excess of the glycol. The resins are preferably in the form of liquids which can be readily admixed with the isocyanate ingredients and they may be either linear or branched polyesters, but somewhat better results have been obtained from using an admixture of substantially linear or low branched polyesters and polyesters which are highly branched. The products of inter-reaction of ethylene glycol, tri-methylene glycol, hexamethylene glycol and adipic, succinic, sebacic, or phthalic acids or mixtures of these acids with phthalic anhydride may be used satisfactorily. Polyfunctional reactants may also be employed to obtain the higher branched type of polyesters including glycerine, trimethylol propane, hexantriol-1,2,6 or the polybasic acids, or both. In most cases the use of one polyfunctional reactant is sufficient, for example, the reaction product of glycerol and phthalic acid or anhydride, when reacted under satisfactory conditions to form a highly branched reaction product, is highly satisfactory for the purposes of this invention.

Polyesters of the above type which have been used satisfactorily in the above proportions are the resins known commercially as Multron R-4, and Multron R-16 available from Mobay Chemical Company and the physical properties of these resins are as follows: Multron R-4 is a 100% solids highly viscous yellow-brown liquid which contains 8.25% OH, has a hydroxyl number of 280-297, a maximum water content of 0.2%, a density of 1.1 at 77° F., a viscosity of 1300 centistokes (X Gardner Holdt) at 72° F. when measured as 80% solids in ethylene glycol monomethylether acetate, and an acid number less than 4, and is a highly branched polyester. Multron R-16 is a substantially linear or lower branched polyester and has a flash point (open cup) of about 500° F., a density of 1.19 at 77° F., an acid number of 1.5 maximum, a hydroxyl number of 38-45, a water content of 0.1% maximum and a viscosity of 960 centistokes at 72° F. when prepared as 80% solids in ethylene glycol monomethylether acetate. The use of all of the polyester in the form of Multron R-4 was found to produce a coating which was somewhat too hard and the addition of the linear polyester, Multron R-16, tended to form a somewhat softer and more resilient coating.

The preferred proportions of low branched or linear polyesters and the higher branched polyesters are in the range of 6:4 to 5:1. It is possible to obtain somewhat less cross-linking between the di-isocyanate and the polyester resin, and thus a more flexible resulting coating, by employing the higher proportions of the substantially linear polyester resin and where flexibility is important the selection of this larger proportion of the substantially linear polyester is desirable. A large number of commercial materials having a comparable degree of branching and hydroxyl groups available for inter-action with the isocyanate groups are available and have been satisfactorily employed in lieu of the Multron R–4 and R–16 resins. Multron R–16 has been satisfactorily replaced by relatively low branched polyester resins available under the trade names Paraplex RG–10, Paraplex 5B, Paraplex G20 and Amberol 801P, products of Rohm & Haas Co.; Aropol 3008, Archer-Daniels-Midland Co.; Du Pont 303 and Dryden 5539B; Rezyl 412–1, 435–1 and 750–17 resins from American Cyanamid; and Foamrez D25–30, Witco Chemical Co. Multron R–4 has been satisfactorily replaced by relatively high branched polyesters available commercially under the designations Amberlac 292, Rohm & Haas Co.; Polyglycol P–750, Dow Chemical Co.; Tween 81, Atlas Powder Co.; Foamrez No. 50, Witco Chemical Co., and SP 102, General Electric Co. These substitute resins have the physical properties shown below in Table I.

and the adducts of 2,4-tolylene diisocyanate and malonic or acetoacetic esters fall into this category. Such adducts are formed, for example, by reacting equivalent ratios of the sodium derivative of ethyl acetoacetate with the diisocyanate in ether and liberating the final product with acetic acid. Mondur CB is the preferred diisocyanate for the compositions of this invention, and as commercially supplied, is a light yellow solution of 74%–76% solids in ethylacetate and contains 12.5%– 13.5% of NCO, based on total weight, a viscosity of 2700–4000 cps. at 68° F., a flash point (open cup) of about 40° F. and a specific gravity of about 1.12. The specific quantity of diisocyanate which is optimum for any given composition is dependent on the specific polyester present and the rate of reactivity of the chosen diisocyanate therewith. The quantity of polyester and diisocyanate, within the given ranges should generally vary in the same direction, i.e., as polyester is increased the diisocyanate should also increase. The rates of reaction of diisocyanates with polyesters are known, relative to each other, and with these general guides, one skilled in the art can quickly arrive at the optimum quantity of the selected diisocyanate for the selected polyester.

The other components of the basic composition, un-

Table I

| | Type | Acid No. | Specific gravity | Viscosity | Solvent | Percent solids | Color |
|---|---|---|---|---|---|---|---|
| Paraplex RG–10 | Non-drying oil modified dibasic acid alkyd | 0–8 | 0.96 | H-L [3] | Aromatics | 100 | Light brown 0–8. |
| Paraplex 5B | Non-drying oil modified maleic polyester | 45–58 [4] | 1 | I-L [5] | do | 80 | Gardner 3–6. |
| Paraplex G–20 | Unmodified sebacic alkyd | 10–20 | 1.02 | H-L [6] | Esters | 100 | Gardner 10–13. |
| Rezyl 412–1 | Soya oil oxidizing, phthalic acid | 3–8 | 0.94 | U-W | Mineral spirits | 50 | Gardner 4–8. |
| Rezyl 435–1 | Soya oil modified phthalic acid | 6–12 | 0.93 | $Z^2$-$Z_5$ | do | 50 | Gardner 5–9. |
| Rezyl 750–17 | Tall oil modified phthalic acid | 15 max | 0.86 | Z-$Z_2$ | VM and P naphtha | 50 | Gardner 9. |
| Witco D25–30 | Polymerized fatty acids polyester | 1.8 | | 18,000 [7] cps | | | Gardner 12–13. |
| Amberlac 292 | Castor oil modified polyester | 0–10 | 0.96 | F-G | Amsco F–80 | 47–50 | Gardner 4 max. |
| Foamrez 50 | Polymerized fatty acids polyester | 2 max | 1.19 | 18,000–21,000 [7] cps | | | Gardner 3 max. |
| Multron R–4 [2] | 280–297 | <4 | 1.1 77° F | 1300 [1] | | 100 | Yellow-brown. |
| Multron R–16 | 38–45 | 1.5 max | 1.19 77° F | 960 [1] | | 100 | |

[1] Centistokes at 72° F., Gardner Holdt, measured as 80% solids in ethylene glycol monomethyl ether acetate.
[2] Contains 8.25% OH.
[3] Gardner-Holdt, 50% in toluol.
[4] Alcohol method.
[5] I means 60% in toluol.
[6] 50% in butyl acetate.
[7] Brookfield Model LVF, spindle No. 4, 12 r.p.m.

The isocyanate component may be any one of the many di-isocyanates which are available and known to be inter-reactive with hydroxyl-rich polyesters and polyethers to effect the urethane reaction. Included in this group are 2,4-tolylene di-isocyanate, 2,6-tolylene di-isocyanate, 1-chloro-2,4-phenylene di-isocyanate, m-phenylene di-isocyanate, 4,4' methylenebis (phenyl isocyanate), 3,3'-dimethyl-4,4' diphenylene diisocyanate, 4,4'-methylenebis (2 methylphenyl isocyanate), 3,3'-diethoxy-4,4'-biphenylene diisocyanate, 2,2', 5,5'-tetramethyl-4,4-biphenylene diisocyanate and mixtures of 2,4-tolylene di-isocyanate and 2,6-tolylene diisocyanate. Moreover, partially reacted diisocyanates can be used and this form is particularly desirable where the diisocyanate is a volatile one. Examples of such partially reacted products include the products of reacting one mole of a triol such as hexanetriol-1,2,6 with 3 moles of tolylene diisocyanate by adding the hexanetriol, dropwise, to the tolylene diisocyanate in dry ethyl acetate, cooling and removing the solvent; the product of reacting tolylene diisocyanate, under similar conditions, with trimethylol propane, which is available commercially as Bayer Desmodur TH and Mondur CB from Mobay Chemical Co. It is also feasible to employ hindered diisocyanates where short pot-life and irritation to workers are problems, or it is desired to formulate a one-component system. A suitable adduct of this type is one which releases its diisocyanate at a temperature in the range of 265° F. to 285° F.

modified in accordance with this invention, include lamp black, powdered silica, cellulose acetate butyrate and solvent. Suitable solvents for polyesters and polyurethanes are now well known to those skilled in this art, are illustrated in the above formulations and need not be discussed further except to say that the quantity of solvent should be such as to allow the composition to be applied by dipping, brushing, spraying or atomizing as desired.

The lampblack performs its normal function and can be replaced by other finely divided pigments such as furnace blocks, channel blocks, oil furnace blocks, etc., and conventional fillers or color-inducing particles such as titanium dioxide, zinc oxide, zinc sulfide, mica, powdered aluminum, precipated whitings, clays, etc., as described. The silica powder performs the function of modifying the gloss of the final coating, as discussed in greater detail hereinbelow. For best results, the silica should be in finely divided or powdered form and have a particle size in the range of about 0.015 micron to about 5 microns in diameter. While larger particle sizes can be used satisfactorily, they do not produce the uniformity of gloss that is obtained from the use of the smaller particles. Such materials are commercially available under the trade designations of Santocel, particle size 0.5–5 micron in diameter, and Cab-O-Sil, particle size 0.015–0.020 micron in diameter.

The cellulose acetate butyrate functions as a flow out or smoothening agent before the solvent is evaporated, and while its presence is preferred, it is not a necessary ingredient. A typically satisfactory one contains 22% acetic acid and 44% butyric acid. The silane resin ingredient also aids in obtaining a smooth coating as well as imparting improved water repellency to the coating and is optionally incorporated, as Formulation I indicates.

These properties in the resulting coating can be obtained by using chloro- or fluoro-silanes having 1–18 carbon atoms, such for example, as methyl chlorosilane, ethyl chlorosilane, siloxanes containing alkyl groups of 12–18 carbon atoms, diethyl-dichlorosilane etc. Good results have been obtained by using a silicone resin available commercially as Dri-Film 103, a methyl chlorosilane resin having a silicone content of 70% in mineral spirits or Solvesso 100, a specific gravity of 1.06–1.09 at 77° F., a Gardner color of 3 maximum, and a viscosity at 68° F. of 20–70 centipoises.

Coatings on rubber surfaces, in order to be commercially satisfactory must exhibit certain minimum properties. The coating must resist blistering or loosening after 48 hours at 100° F. and 100% relative humidity. The coating must remain unchanged when subjected to the equivalent of direct sun rays for 200 hours as established by the use of an RS lamp at a distance of twelve inches from the coating in accordance with the test procedure of ASTM D–925. The coatings should also show no change after 90 days exposure to industrial atmospheres, and resistance to change after 70 hours in an atmosphere containing 50 parts of ozone per million parts of air at 100° F. The more important properties of flexibility and adhesion are established relative to temperature as follows. At room temperature a coating must be sufficiently adherent to resist peeling after the coating has been cut with a sharp knife to establish intersecting legs of a triangle about ⅜″ long and the apex of the triangle is attempted to be peeled from the surface. Adherence at −20° F. is unsatisfactory when cracking of the coating occurs as the coating which has been maintained at −20° F. for 24 hours is bent 180° around a mandrel. Similarly the adherence at −40° F. is unsatisfactory where the coating cracks, under the same bending conditions, after the coated article has been maintained at −40° F. for 48 hours. Flexibility at room temperature, −20° F. and −40° F. is considered satisfactory when the coating resists checking, cracking or separating from the rubber surface upon continuously repeated flexing of the coated article at each temperature. Moreover the coating should possess low friction characteristics relative to untreated rubber surfaces for a large number of applications and this property is sufficiently indicated by a qualitative drag test comprising moving a piece of stainless steel across the untreated rubber and coated rubber surface under the same pressure conditions.

As above indicated polyurethane coatings, unmodified, failed in flexibility under low temperature conditions and also failed in humidity resistance. A controlled proportion of an epoxy resin increases adhesion at all temperatures of use and the presence of a polyurethane elastomer improves flexibility especially at low temperatures. The incorporation of an epoxy resin without concurrently adding a polyurethane elastomer resulted in a decrease in the flexibility of the coating and the presence of both of these modifiers is necessary to produce the improved properties coatings of this invention. Epoxy resins which are suitable as modifiers in the compositions of this invention are the low molecular weight epoxy resins having an epoxide equivalent in the range of about 170 to about 275 and an average molecular weight in the range of about 340 to about 500. Such epoxy resins may be formed from a variety of starting materials with the most common and most useful representative resulting from the catalyzed condensation of epichlorohydrin and bisphenol A. Other halo hydrins may be employed such as dichlorohydrin and 1,2-dichloro-3 hydroxypropane and other polynuclear polyhydroxy phenols such as bisphenol F, trihydroxyl diphenyl dimethyl methane, 4,4′ dihydroxy biphenyl, dihydroxyl diphenyl sulfone, etc. The mononuclear di- and trihydroxy phenols can be satisfactorily employed such as resorcinol, pyro-catechol, phloroglucinol, etc. The polyalcohols, particularly glycerine and ethylene glycol form glycidyl ethers which are satisfactory. A number of commercially available epoxy resins have been satisfactorily employed including resins commercially available under the trade designation Epon 828, Polytool epoxy resin 6130, and Polytool epoxy resin 6140. Epon 828 has an epoxy equivalent of 175–210, a molecular weight of 350–400 and a viscosity of 5000–15000 cps. Polytool 6130 has an epoxide equivalent of 175–210, a molecular weight of 350–420, a viscosity of 500–900 cps. and a specific gravity of 1.12 to 1.14. Polytool epoxy resin 6140 has an epoxide equivalent of 175–210, a molecular weight of 350–420 and a viscosity of 10,000–19,000 cps. and a specific gravity of 1.15–1.17. In Formula I it has been found that a portion of the epoxy resin can be replaced by a polysulfide polymer, in a quantity up to 100% by weight of the epoxy resin, of the type having the general formula:

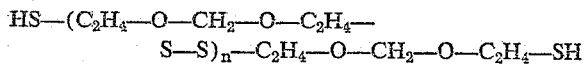

HS—(C$_2$H$_4$—O—CH$_2$—O—C$_2$H$_4$—S—S)$_n$—C$_2$H$_4$—O—CH$_2$—O—C$_2$H$_4$—SH

A typical resin of this type is the resin commercially available under the designation LP–3 from the Thiokol Corporation, and having a molecular weight of 1000, 2% cross linking, a specific gravity of 1.27, a viscosity of 700–1200 cps., an open cup flash point of 214° C., a pH of 6 to 8 and a clear amber color.

The liquid polyurethane elastomer set forth in Formula I is an isocyanate polyurethane rubber or partial polymer of polyether glycol and diisocyanate and is typified by an elastomer available commercially under the designation Adiprene L. This elastomer has a specific gravity of 1.06, a viscosity of 23000 cps. at 77° F., contains approximately 4% NCO by weight, is self extinguishing, and is an isocyanate terminated polymer. It is soluble in carbon tetrachloride to the extent of 3.5 grams per gram, in methylethyl ketone to the extent of 5.3 grams per gram and in toluene to the extent of 2.9 grams per gram.

In the preferred formulations of this invention the hydroxy terminated diisocyanate polymer which has been found to be satisfactory is a linear polyol-diisocyanate polymer which terminates in hydroxyl groups. A typically suitable material of this type is commercially available under the designation Multranil H from Mobay Chemical Company.

The compositions of this invention are applied to the preliminarily polarized rubber surfaces by dipping and brushing, spraying or atomizing the surface with a sufficient quantity of the composition to completely cover the surface, allowing the excess to drain therefrom, drying the coating in air or warmed air for a short time, e.g. 15 seconds, and thereafter baking the dried coating on the surface for 35–40 minutes at a temperature between about 260° F. and 285° F. For the majority of rubber substrates and the coating compositions of this invention a temperature of about 265° F. has been found to produce the greatest uniformity in adhesion and flexibility in the resulting coating.

The fact that the polyester ingredient and the diisocyanate ingredient, other than hindered diisocyanates, are inter-reactive at room temperature requires that the composition of Formulation I be prepared as a two-package system. Moreover, it is desirable to intimately admix the polyester resin with the lampblack, silica powder and cellulose acetate butyrate so as to produce uniformity in color and final appearance in the coating and this mixing step is unnecessary for the modifying ingredients of this invention. Thus, a suitable compounding procedure involves the admixing of the indicated quantities of polyester resin, lampblack, silica powder, cellulose acetate butyrate, and silicone resin, in the indicated quantities of solvent and inserting this admixture into a ball mill and ball-milling the ingredients with balls of flint, for example, for 15 to 20 hours. The resulting ball milled material is a smooth intimately admixed composition which is suitable for easy admixture with the modifying ingredients of this invention. Typical formulations of this ingredient are set forth below in Table II.

*Table II*

|  | Percent by weight (1) | Percent by weight (2) | Percent by weight (3) |
| --- | --- | --- | --- |
| Multron R-4 | 7 | 6.9 | 6.7 |
| Multron R-16 | 21.75 | 21.5 | 20.8 |
| Lampblack | 1.5 | 1.5 | 1.5 |
| Santocel | 4.25 | 5.1 | 8.5 |
| Cellulose acetate butyrate (10%) | 5 | 5.4 | 5.2 |
| Dri-film (2%), 103 | 0.8 | 0.8 | 0.8 |
| Glycol monoethylether acetate | 29.7 | 29.2 | 29.3 |
| Toluene | 15 | 14.8 | 14.1 |
| Xylene | 15 | 14.8 | 14.1 |
|  | 100 | 100 | 100 |

The typical compositions shown in Table I contain varying proportions of silica powder and these variations modify the gloss of the resulting final coating. The composition labeled (1) results in a medium gloss satin finish coating, and the composition labeled (2) produces a satin finish, while the composition labeled (3) produces a flat finish having very low reflectivity.

The above ingredients are then admixed with the second package portion of the composition of this invention to produce a medium gloss, satin finish and flat finish coatings having an over-all composition, in percent by weight, as follows:

|  | Percent by weight (4) | Percent by weight (5) | Percent by weight (6) |
| --- | --- | --- | --- |
| Multron R-4 | 4.3 | 4.1 | 4 |
| Multron R-16 | 13.6 | 13.4 | 13 |
| Lampblack | 0.9 | 0.9 | 0.9 |
| Santocel (silica powder) | 2.6 | 3.2 | 5.3 |
| Cellulose acetate butyrate (10%) | 2.9 | 3.3 | 3.2 |
| Dri-film (2%), 103 | 0.5 | 0.5 | 0.5 |
| Glycol monoethylether acetate | 18.6 | 18.3 | 17.7 |
| Toluene | 9.4 | 9.2 | 8.8 |
| Xylene | 9.4 | 9.2 | 8.8 |
| Trimethylol propane triisocyanate (Mondur CB) | 12 | 12 | 12.1 |
| Epoxy resin (Epon 828) | 8 | 8 | 8 |
| Isocyanate terminated polyurethane elastomer, Adiprene L | 4 | 4 | 4 |
| Amine curing agent (4,4′ methylene-bis 2-chloro-aniline) | 0.5 | 0.5 | 0.5 |
| Hydroxy terminated diisocyanate polymer (Multranil H, 30%) | 6.2 | 6.2 | 6.2 |
| Ethyl acetate | 4.7 | 4.7 | 4.7 |
| Toluene | 2.2 | 2.3 | 2.05 |
| Dimethyl coco amine | 0.2 | 0.2 | 0.25 |

Composition 4 produces a medium gloss satin finish coating, composition 5 produces a satin finish and composition 6 produces a flat finish coating. Compositions 4, 5 and 6 are used in the succeeding examples, in a number of instances, as the basic composition which is modified to illustrate the function of the separate ingredients in the coating and to indicate satisfactory substitutes therefor.

The method and composition of this invention will be more fully understood from a consideration of the typical examples which are set forth below. The particular proportions of ingredients employed, the particular ingredients themselves, and the illustrated conditions of operation are not to be construed as the limiting or defining conditions or materials of this invention, but rather only as illustrative thereof.

EXAMPLE I

A plurality of extruded rubber strips approximately ½″ wide, 18″ long and ¼″ to ½″ thick were spray coated with the above composition (5), (Ford Cup No. 4, viscosity—30 seconds), the excess was allowed to drain from the surface and the coating was dried in air for 15 seconds. The dry coated parts were then positioned in an oven at 265° F. and baked for 30 minutes, and then withdrawn.

Another batch of identical extruded rubber moldings were toluene rag wiped and dipped in an aqueous acidic solution containing .1% sodium hypochlorite and ½% concentrated hydrochloric acid for 5 seconds, withdrawn, rinsed in water and dried. In this dried form these strips were spray coated with the above composition (5) under the identical conditions described above in connection with the first group of extruded rubber moldings, dried and baked in the same manner.

Both sets of coated rubber moldings were subjected to tests for adhesion, low temperature flexibility after 24 hours at −20° F., for slip, then aged in an oven for 900 hours at 158° F. and retested for adhesion, low temperature flexibility at −20° F. and for slip. Each of these tests was conducted in accordance with the description of the tests set forth hereinabove. The moldings which were not preliminarily polarized were characterized by good original slip, but the adhesion and flexibility, both immediately after baking and after oven aging for 900 hours, were inferior to the adhesion and flexibility obtained with the moldings which had been polarized. While the difference in flexibility immediately after baking was not considered a failure, a number of the moldings did fail by developing cracks in the coating.

Another plurality of extruded rubber moldings were polarized by wiping the surface with perchloroethylene, then dipped in a trisodium phosphate aqueous solution containing 5% trisodium phosphate, removed and then immersed in a plurality of sulfuric acid solutions having concentrations of .5%, 1%, 2%, 3%, 4%, 10%, 12% and 25%. These moldings were sprayed in accordance with the identical procedure set forth above, dried and cured in the same manner and subjected to the same tests. All of the coatings except those resulting from the 12% and 25% sulfuric acid dip exhibited substantially identical properties to those possessed by the group of moldings which were preliminarily polarized in the hydrochloric acid-chlorite polarizing solution. The moldings from the 12% and 25% sulfuric acid solutions failed in the flexibility test after having been in the aging oven for 900 hours at 158° F.

A number of additional polarizing solutions were prepared to contain chloride, bromide and iodide concentrations, 0.01%, 0.1%, 0.3%, 0.5% and 0.6%, and each of these solutions additionally contained .5% concentrated sulfuric acid. Similar extruded rubber moldings were immersed in each of these solutions for approximately 5 seconds, withdrawn, rinsed and dried and thereafter coated with composition (5) in an identical manner to that set forth above. While minor differences in the adhesion test after baking were apparently detectable, all of the coatings successfully passed each of the tests above set forth for the moldings in the previously described polarized solutions except the moldings resulting from the solutions containing 0.6% chloride, bromide and iodide.

EXAMPLE II

A composition identical to the above composition (5) was prepared except all of the Multron R-16 resin was replaced by Multron R-4 and the other components were unchanged. Coatings sprayed on polarized rubber moldings were found to be defective when tested for adhesion. The coating was brittle and failed in the flexibility test at −20° F.

Composition (5) was modified by introducing equal proportions of Multron R-4 and R-16 and when this composition was applied to polarized rubber surfaces the coatings were found to pass all of the adhesion, flexibility and slip tests immediately after baking and after oven aging for 900 hours at 158° F.

In a similar variation except that Multron R-4 was modified to be present in the ratio of 3:1 to the Multron R-16 resin, similarly applied and tested coatings showed the coating to be too brittle to successfully pass the flexibility test at −20° F.

Composition (5) was modified by replacing the Multron

R-4 resin with Multron R-16 resin. Coatings formed on polarized rubber surfaces with this composition were found to have poor slip characteristics both immediately after baking and after oven aging for 900 hours at 158° F.

EXAMPLE III

Composition (5) was modified by removing the epoxy resin, and a plurality of rubber moldings were coated with the resulting composition, all other ingredients being unchanged. Rubber moldings, polarized by the method of this invention and coated with the composition were found to be satisfactory in all tests except it was noted that the slip both after baking and after oven aging was inferior to slip obtained from the use of compositions containing the epoxy resin and the adhesion after oven aging was somewhat inferior as well.

EXAMPLE IV

Composition (5) was modified by removing all of the Adiprene L, the Multranil H, the dimethyl coco amine and the amine curing agent from the formulation, but maintaining all other ingredients unchanged. This composition was applied to form coatings in the identical manner set forth above on rubber moldings and these moldings were subjected to the same series of tests above indicated. The coatings had a satin appearance and were satisfactory, after baking, in adhesion and flexibility at −20° F., but were inferior in slip chraracteristics to moldings produced from compositions containing the Adiprene L and Multronil H and catalyst ingredients. Moreover, the coatings were found to fail in flexibility at −20° F. after they had been subjected to 1000 hours aging in an oven at 158° F. A number of these coatings were subjected to outdoor exposure to a mid-western city industrial atmosphere by positioning the moldings in a plane angled 45 degrees from the vertical and facing southwest. After this aging, the surfaces were found to be inferior in slip characteristics, to moldings coated with solutions containing the removed ingredients and weather-aged in the same manner.

What is claimed is:

1. A method for forming a flexible resinous coating on a rubber surface which comprises the steps of polarizing the said rubber surface by contacting the surface with an aqueous acidic solution having an acidity equivalent to that resulting from the presence therein of about 0.5% to about 10% of concentrated sulfuric acid, drying the said surface, and thereafter spraying on said surface a composition comprising 12% to 21% polyester resin, 10% to 15% polyfunctional isocyanate, 0.5%–5% lampblack, 1% to 7% powdered silica, 0–4% of 10% cellulose acetate butyrate, 0.25%–0.8% of an amine curing agent, 3%–10% of a low molecular weight epoxy resin having an epoxide equivalent in the range of about 170 to about 275, 2%–6% liquid isocyanate terminated polyurethane elastomer, said elastomer containing approximately 4% NCO by weight and having a specific gravity of 1.06, and 42%–46% solvent for said resinous ingredients, drying the said coating and thereafter baking the coated rubber article at a temperature in the range of 265° F. to 285° F. until the resinous ingredients are cured.

2. A rubber article having on its surface a cured resinous composition produced in accordance with the method of claim 1.

3. A method for forming a flexible resinous coating on a rubber surface which comprises the steps of polarizing the said rubber surface by contacting the surface with an aqueous acidic solution having an acidity equivalent to that resulting from the presence therein of about 0.5% to about 10% of concentrated sulfuric acid, drying the said surface, and thereafter applying to said surface a composition comprising 14% to 19% polyester resin, 11% to 13% polyfunctional isocyanate, 1% to 3% lampblack, 2% to 6% silica power, 0.15%–0.4% cellulose acetate butyrate, 0.25% to 0.8% of an amine curing agent, 0.005% to 0.03% of a smoothening agent selected from the group consisting of chloro- and fluoro-silanes having 1–18 carbon atoms, and chloro- and fluoro-siloxane resins having 12–18 carbon atoms, 7% to 9% epoxy resin, 3% to 5% liquid isocyanate terminated polyurethane elastomer, said elastomer containing approximately 4% NCO by weight and having a specific gravity of 1.06, 1% to 8% hydroxy terminated polyurethane polymer formed by the reaction between a linear polyglycol and a diisocyanate, and 42% to about 51% solvent for said resinous ingredients, drying the said coating and thereafter baking the coated rubber article at a temperature in the range of 265° F. to 285° F. until the resinous ingredients are cured.

4. A method for forming a flexible resinous coating on a rubber surface which comprises the steps of polarizing the said rubber surface by contacting the surface with an aqueous acidic solution having an acidity equivalent to that resulting from the presence therein of about 0.5% to about 10% of concentrated sulfuric acid, drying the said surface, and thereafter applying to said surface a composition consisting essentially of high branched polyester resin 4.3%, low branched polyester resin—13.6%, lamp black 0.9%, silica powder 2.6%, cellulose acetate butyrate 0.3%, 0.005% to 0.03% of a smoothening agent selected from the group consisting of chloro- and fluoro-silanes having 1–18 carbon atoms, and chloro- and fluoro-siloxane resins having 12–18 carbon atoms, trimethylol propane triisocyanate 12%, epoxy resin 8%, isocyanate terminated polyurethane elastomer 4%, said elastomer containing approximately 4% NCO by weight and having a specific gravity of 1.06, amine curing agent 0.5%, 30% hydroxy terminated polyurethane polymer formed by the reaction between a linear polyglycol and a diisocyanate 6.2%, dimethyl coco amine 0.2%, and about 47% solvent for said resinous ingredients, drying the said coating and thereafter baking the coated rubber article at a temperature in the range of about 265° F. to about 285° F. until the resinous ingredients are cured.

5. A method for forming a flexible resinous coating on a rubber surface which comprises the steps of polarizing the said rubber surface by contacting the surface with an aqueous acidic solution having an acidity equivalent to that resulting from the presence therein of about 0.5% to about 10% of concentrated sulfuric acid, drying the said surface, and thereafter applying to said surface a composition consisting essentially of high branched polyester resin 4.1%, low branched polyester resin 13.4%, lampblack 0.9%, silica powder 3.2%, cellulose acetate butyrate about 0.33%, 0.005% to 0.03% of a smoothening agent selected from the group consisting of chloro- and fluoro-silanes having 1–18 carbon atoms, and chloro- and fluoro-siloxane resins having 12–18 carbon atoms, trimethylol propane triisocyanate 12%, epoxy resin 8%, isocyanate terminated polyurethane elastomer 4%, said elastomer containing approximately 4% NCO by weight and having a specific gravity of 1.06, amine curing agent 0.5%, 30% hydroxy terminated polyurethane polymer formed by the reaction between a linear polyglycol and a diisocyanate 6.2%, dimethyl coco amine 0.2%, and about 47% solvent for said resinous ingredients, drying the said coating and thereafter baking the coated rubber article at a temperature in the range of about 265° F. to about 285° F. until the resinous ingredients are cured.

6. A method for forming a flexible resinous coating on a rubber surface which comprises the steps of polarizing the said rubber surface by contacting the surface with an aqueous acidic solution having an acidity equivalent to that resulting from the presence therein of about 0.5% to about 10% of concentrated sulfuric acid, drying the said surface, and thereafter applying to said surface a composition consisting essentially of high branched polyester resin 4%, low branched polyester resin 13%, lampblack 0.9%, silica powder 5.3%, cellulose acetate butyrate about 0.32%, 0.005% to 0.03% of a smoothening agent selected from the group consisting of chloro- and fluoro-silanes having 1–18 carbon atoms, and chloro- and fluoro-siloxane resins having 12–18 carbon atoms, trimethylol propane triisocyanate 12.1%, epoxy resin 8%, isocyanate terminated polyurethane elastomer 4%, said elastomer containing approximately 4% NCO by weight and having a specific gravity of 1.06 amine curing agent 0.5%, 30% hydroxy terminated polyurethane polymer formed by the reaction between a linear polyglycol and a diisocyanate 6.2%, dimethyl coco amine 0.25% and about 45% solvent for said resinous ingredients, drying the said coating and thereafter baking the coated rubber article at a temperature in the range of about 265° F. to about 285° F. until the resinous ingredients are cured.

7. A composition for forming a flexible resinous coating on a rubber surface comprising 12% to 21% polyester resin, 10% to 15% polyfunctional isocyanate, 0.5% to 5% lampblack, 1% to 7% powdered silica, 0 to 0.4% of cellulose acetate butyrate, 0.25%–0.8% of an amine curing agent, 0.005% to 0.03% of a smoothening agent selected from the group consisting of chloro- and fluoro-silanes having 1–18 carbon atoms, and chloro- and fluoro-siloxane resins having 12–18 carbon atoms, 3% to 10% epoxy resin, 2% to 6% liquid isocyanate terminated polyurethane elastomer, said elastomer containing approximately 4% NCO by weight and having a specific gravity of 1.06, 0 to 10% hydroxy terminated polyurethane polymer formed by the reaction between a linear polyglycol and a diisocyanate, and about 42% to 51% solvent for said resinous ingredients.

8. A composition for forming a flexible resinous coating on a rubber surface comprising 14% to 19% polyester resin, 11% to 13% polyfunctional isocyanate, 1% to 3% lampblack, 2% to 6% silica powder, 0.15% to 0.04% cellulose acetate butyrate, 0.25% to 0.8% of an amine curing agent, 0.005% to 0.03% of a smoothening agent selected from the group consisting of chloro- and fluoro-silanes having 1–18 carbon atoms, and chloro- and fluoro-siloxane resins having 12–18 carbon atoms, 7% to 9% epoxy resin, 3% to 5% liquid isocyanate terminated polyurethane elastomer, said elastomer containing approximately 4% NCO by weight and having a specific gravity of 1.06, 1% to 8% hydroxy terminated polyurethane polymer formed by the reaction between a linear polyglycol and a diisocyanate, and 42% to about 51% solvent for said resinous ingredients.

9. A composition for forming a flexible resinous coating on a rubber surface consisting essentially of high branched polyester resin 4.3%, low branched polyester resin 13.6%, lampblack 0.9%, silica powder 2.6%, cellulose acetate butyrate about 0.3%, 0.005% to 0.03% of a smoothening agent selected from the group consisting of chloro- and fluoro-silanes having 1–18 carbon atoms, and chloro- and fluoro-siloxane resins having 12–18 carbon atoms, trimethylol propane triisocyanate 12%, epoxy resin 8%, isocyanate terminated polyurethane elastomer 4%, said elastomer containing approximately 4% NCO by weight and having a specific gravity of 1.06, amine curing agent 0.5%, 30% hydroxy terminated polyurethane polymer formed by the reaction between a linear polyglycol and a diisocyanate 6.2%, dimethyl coco amine 0.2%, and about 47% solvent for said resinous ingredients.

10. A composition for forming a flexible resinous coating on a rubber surface consisting essentially of high branched polyester resin 4.1%, low branched polyester resin 13.4%, lampblack 0.9%, silica powder 3.2%, cellulose acetate butyrate 0.33%, 0.005% to 0.03% of a smoothening agent selected from the group consisting of chloro- and fluoro-silanes having 1–18 carbon atoms, and chloro- and fluorosiloxane resins having 12–18 carbon atoms, trimethylol propane triisocyanate 12%, epoxy resin 8%, isocyanate terminated polyurethane elastomer 4%, said elastomer containing approximately 4% NCO by weight and having a specific gravity of 1.06, amine curing agent 0.5%, 30% hydroxy terminated polyurethane polymer formed by the reaction between a linear polyglycol and a diisocyanate 6.2%, dimethyl coco amine 0.2%, and about 47% solvent for said resinous ingredients.

11. A composition for forming a flexible resinous coating on a rubber surface consisting essentially of high branched polyester resin 4%, low branched polyester resin 13%, lampblack 0.9%, silica powder 5.3%, cellulose acetate butyrate 0.32%, 0.005% to 0.03% of a smoothening agent selected from the group consisting of chloro- and fluoro-silanes having 1–18 carbon atoms, and chloro- and fluoro-siloxane resins having 12–18 carbon atoms, trimethylol propane triisocyanate 12.1%, epoxy resin 8%, isocyanate terminated polyurethane elastomer 4%, said elastomer containing approximately 4% NCO by weight and having a specific gravity of 1.06, amine curing agent 0.5%, 30% hydroxy terminated polyurethane polymer formed by the reaction between a linear polyglycol and a diisocyanate 6.2%, dimethyl coco amine 0.25% and about 45% solvent for said resinous ingredients.

References Cited in the file of this patent

UNITED STATES PATENTS

| | | |
|---|---|---|
| 260,441 | Woodward | July 4, 1882 |
| 2,153,525 | Snelling | Apr. 4, 1939 |
| 2,687,398 | McLean | Aug. 24, 1954 |
| 2,729,609 | Tess et al. | Jan. 3, 1956 |
| 2,799,663 | Hampton et al. | July 16, 1957 |
| 2,830,965 | Ott | Apr. 15, 1958 |
| 2,874,068 | Von Spulak | Feb. 17, 1959 |
| 2,955,958 | Brown | Oct. 11, 1960 |

FOREIGN PATENTS

| | | |
|---|---|---|
| 736,953 | Great Britain | Sept. 14, 1955 |